(12) United States Patent
Asafuku

(10) Patent No.: US 8,477,353 B2
(45) Date of Patent: Jul. 2, 2013

(54) INFORMATION PROCESSING APPARATUS, PRINTING METHOD, PRINTING SYSTEM, AND NON-TRANSITORY COMPUTER-READABLE STORAGE MEDIUM

(75) Inventor: Minoru Asafuku, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 488 days.

(21) Appl. No.: 12/874,478

(22) Filed: Sep. 2, 2010

(65) Prior Publication Data

US 2011/0181907 A1 Jul. 28, 2011

(30) Foreign Application Priority Data

Jan. 22, 2010 (JP) ................... 2010-012440

(51) Int. Cl.
*G06F 3/12* (2006.01)
*G06K 15/00* (2006.01)

(52) U.S. Cl.
USPC ........ 358/1.15; 358/1.13; 358/1.16; 358/1.18

(58) Field of Classification Search
None
See application file for complete search history.

(56) References Cited

U.S. PATENT DOCUMENTS

| | | | |
|---|---|---|---|
| 6,040,920 A * | 3/2000 | Ichiriki | 358/403 |
| 6,505,252 B1 | 1/2003 | Nagasaka | |
| 6,519,049 B1 | 2/2003 | Nagasaka | |
| 6,981,053 B2 | 12/2005 | Nagasaka | |
| 6,995,855 B2 | 2/2006 | Nagasaka | |
| 7,444,646 B2 * | 10/2008 | Su et al. | 719/321 |
| 7,711,766 B2 | 5/2010 | Nagasaka | |
| 2002/0163665 A1 * | 11/2002 | Iwata et al. | 358/1.15 |
| 2005/0237552 A1 | 10/2005 | Nagasaka | |
| 2006/0221370 A1 * | 10/2006 | Iida | 358/1.13 |
| 2008/0140821 A1 * | 6/2008 | Tada | 709/223 |

FOREIGN PATENT DOCUMENTS

| | | |
|---|---|---|
| JP | 2004-246916 A | 9/2004 |
| JP | 2006-134043 A | 5/2006 |
| JP | 2007-36987 A | 2/2007 |
| JP | 2008-152545 A | 7/2008 |

* cited by examiner

*Primary Examiner* — Dov Popovici
(74) *Attorney, Agent, or Firm* — Sughrue Mion, PLLC

(57) ABSTRACT

An information processing apparatus includes an application executing unit and a printing program executing unit. The application executing unit executes an application according to operation content received from an external terminal apparatus and outputs a printing command to print an execution result. The printing program executing unit receives the printing command output from the application executing unit using a pseudo-printing apparatus driver and transmits the printing command from the pseudo-printing apparatus driver to a pseudo-application that can output the printing command to a printing apparatus driver of the external terminal apparatus connected to a printing apparatus through a local area network.

6 Claims, 7 Drawing Sheets

INFORMATION PROCESSING APPARATUS, PRINTING METHOD, PRINTING SYSTEM, AND NON-TRANSITORY COMPUTER-READABLE STORAGE MEDIUM

CROSS-REFERENCE TO RELATED APPLICATIONS

This application is based on and claims priority under 35 USC 119 from Japanese Patent Application No. 2010-12440 filed Jan. 22, 2010.

BACKGROUND

Technical Field

The invention relates to an information processing apparatus, a printing method, a printing system, and a non-transitory computer-readable medium storing a computer to execute a printing process.

SUMMARY

An information processing apparatus includes an application executing unit and a printing program executing unit. The application executing unit executes an application according to operation content received from an external terminal apparatus and outputs a printing command to print an execution result. The printing program executing unit receives the printing command output from the application executing unit using a pseudo-printing apparatus driver and transmits the printing command from the pseudo-printing apparatus driver to a pseudo-application that can output the printing command to a printing apparatus driver of the external terminal apparatus connected to a printing apparatus through a local area network.

BRIEF DESCRIPTION OF THE DRAWINGS

Detailed description of exemplary embodiments of the invention will be described in detail below based on the accompanying drawings.

DETAILED DESCRIPTION

[First Exemplary Embodiment]

Figure 1:
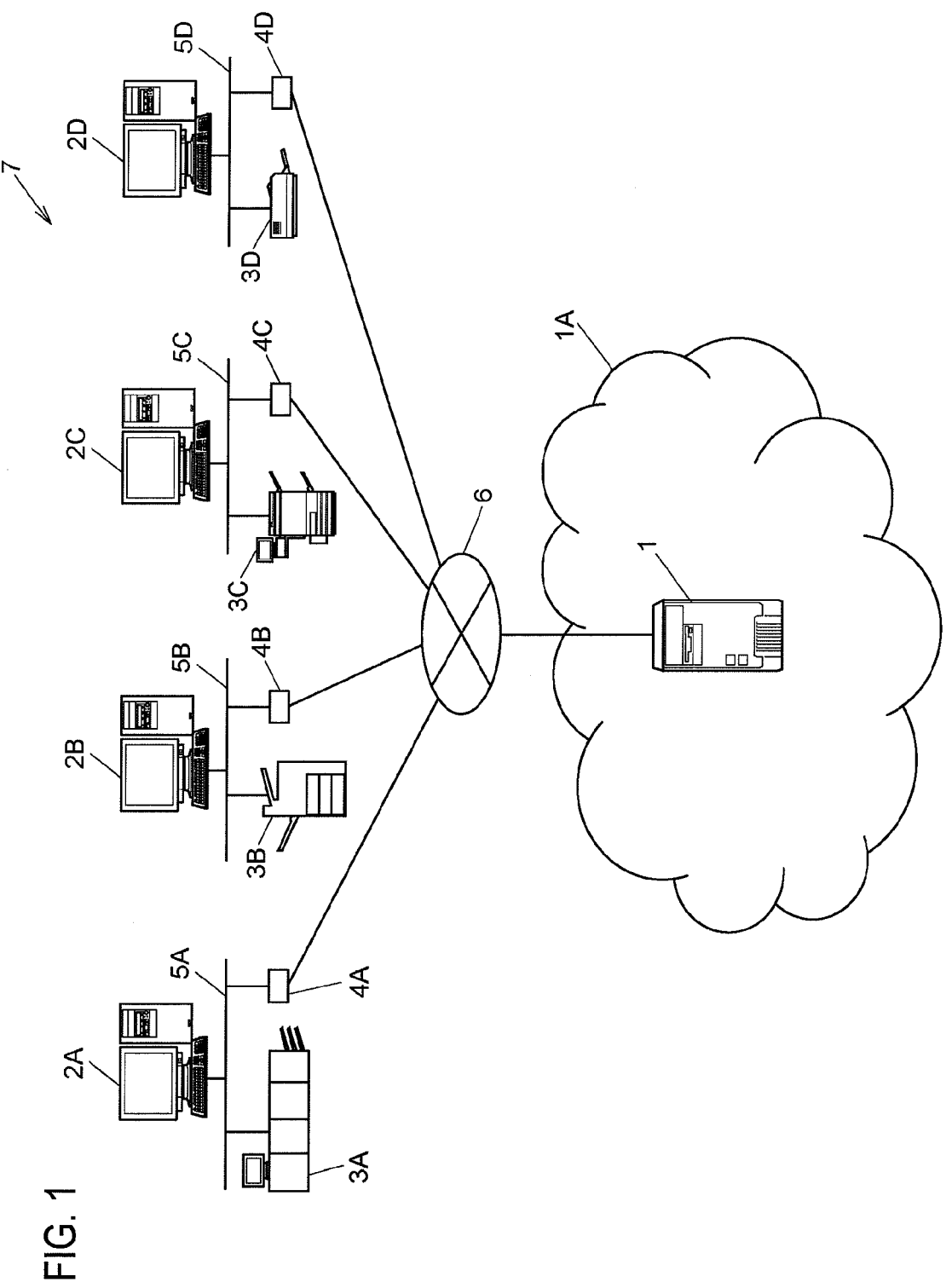
FIG. 1 is a diagram schematically illustrating an example of the configuration of a printing system according to a first exemplary embodiment of the invention.

FIG. 1 is a diagram schematically illustrating an example of the configuration of a printing system according to a first exemplary embodiment of the invention.

A printing system 7 is configured as follows. A terminal apparatus 2A and a printing apparatus 3A are connected to each other by a LAN (Local Area Network) 5A. A server 1 is connected to the LAN 5A through a router 4A and the Internet 6.

Terminal apparatuses 2B to 2D, printing apparatuses 3B to 3D, routers 4B to 4D, and LANs 5B to 5D are connected to the server 1 through the Internet 6, similar to the terminal apparatus 2A, the printing apparatus 3A, the router 4A, and the LAN 5A. In FIG. 1, the single terminal apparatus 2A (to 2D) and the single printing apparatus 3A (to 3D) are connected to the corresponding LAN 5A (to 5D), but plural terminal apparatuses and/or plural printing apparatuses may be connected to each of the LANs 5A to 5D.

The server 1 is operated in a distributed execution environment 1A. In general, the resources of plural servers are used to distribute a process load such as an application. However, for ease of explanation, the case where the single server 1 is provided will be described. Applications operate according to an operation input to the terminal apparatuses 2A to 2D.

The terminal apparatuses 2A to 2D are operated by users to request the server 1 to execute applications. The terminal apparatuses 2A to 2D have a schematic configuration including a control section, which is, for example, a CPU (Central Processing Unit), a storage section that stores information, an operating section 24, such as a keyboard or a mouse, and a display section, such as a liquid crystal display (LCD).

The printing apparatuses 3A to 3D print print data received from the terminal apparatuses 2A to 2D. The printing apparatuses 3A to 3D may be different kinds of machines, and printing-apparatus drivers for operating the printing apparatuses 3A to 3D are included in the terminal apparatuses 2A to 2D.

Figure 2:
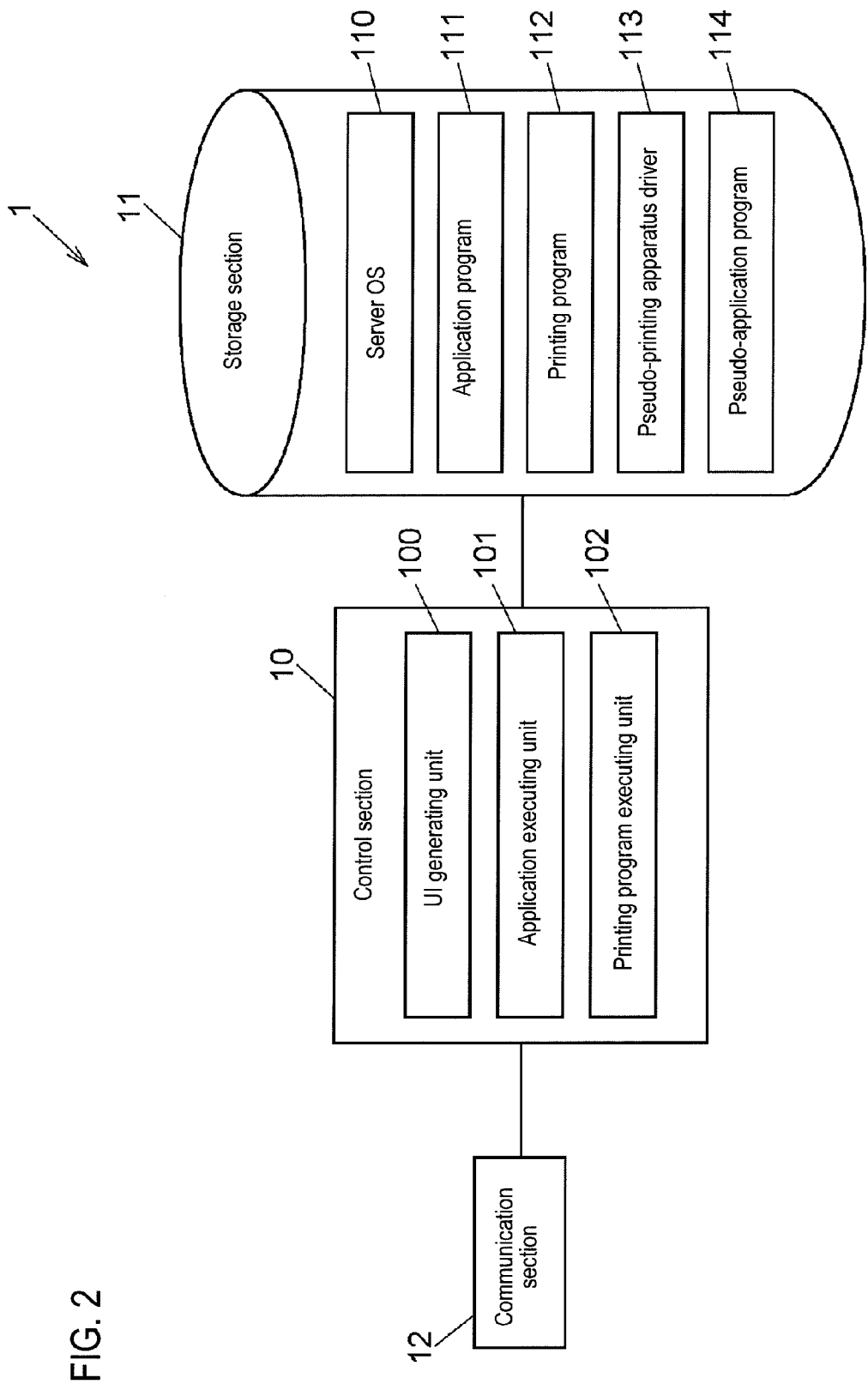
FIG. 2 is a diagram schematically illustrating an example of the configuration of a server.

FIG. 2 is a diagram schematically illustrating an example of the configuration of the server 1.

The server 1 includes a control section 10 which is, for example, a CPU, controls respective portions of the server 1, and executes various kinds of programs, a storage section 11 which is a storage device, such as an HDD (Hard Disk Drive) or a flash memory, and stores various kinds of information, and a communication section 12 that communicates with an outside through the Internet 6.

The control section 10 executes a server OS 110 and serves as a user interface (hereinafter, referred to as a "UI") generating unit 100, an application executing unit 101, and a printing program executing unit 102.

The UI generating unit 100 generates image information for operation to be displayed on the terminal apparatuses 2A to 2D, according to the operation content received from the terminal apparatuses 2A to 2D.

The application executing unit 101 executes and operates an application 111, which will be described later, according to the operation content received from the terminal apparatuses 2A to 2D.

The printing program executing unit 102 executes a printing program 112, which will be described later. The execution content will be described later.

The storage section 11 includes the server OS 110 that allows the control section 10 to serve as the above-mentioned units, the application 111, such as a word processor or spreadsheet software operated on the server OS 110, the printing program 112 for allowing the printing apparatuses 3A to 3D to execute printing according to a request of the application 111, a pseudo-printing apparatus driver 113 that is treated and runs as a printing apparatus driver on the server OS 110 and communicates with a pseudo-application 114, and the pseudo-application 114 that is treated and runs as an application on the terminal apparatuses 2A to 2D and communicates with the pseudo-printing apparatus driver 113.

Figure 3:
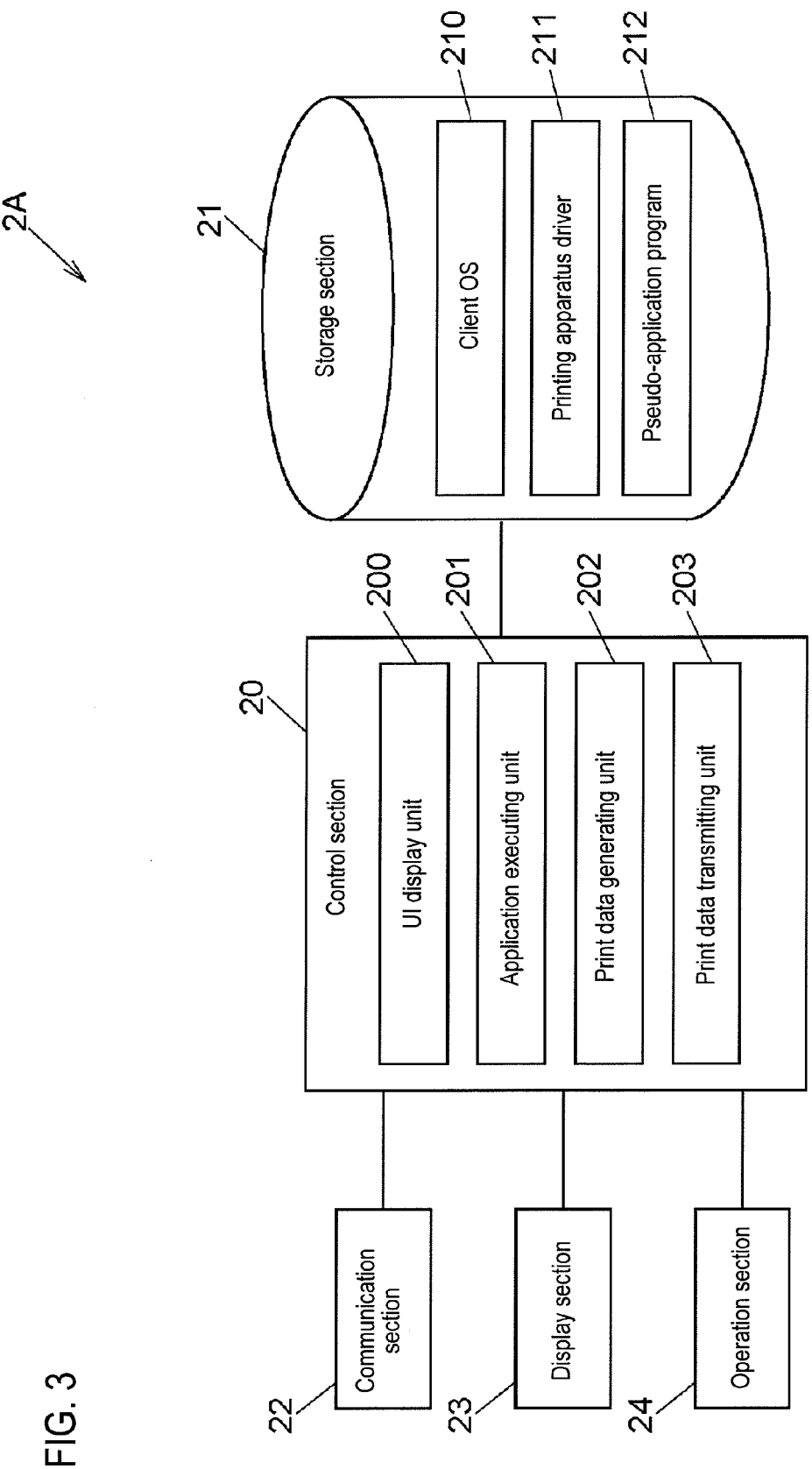
FIG. 3 is a diagram schematically illustrating an example of the configuration of a terminal apparatus.

FIG. 3 is a diagram schematically illustrating an example of the configuration of the terminal apparatus 2A. The terminal apparatuses 2B to 2D have the same structure as the terminal apparatus 2A and description thereof will be omitted.

The terminal apparatus 2A includes a control section 20 which is, for example, a CPU, controls each unit of the terminal apparatus 2A, and executes various kinds of programs, a storage section 21 which is a storage device, such as an HDD (Hard Disk Drive) or a flash memory, and stores various kinds of information, a communication section 22 that communicates with the outside through the Internet 6, a display section 23, such as a liquid crystal display (LCD), and an operating section 24 such as a keyboard or a mouse.

The control section 20 executes a client OS 210 and serves as, for example, a UI display unit 200, an application executing unit 201, a print data generating unit 202, and a print data transmitting unit 203.

The UI display unit 200 displays the UI generated by the UI generating unit 100 of the server 1.

The application executing unit 201 executes and operates a pseudo-application 212. The pseudo-application 212 is treated similarly to a general application that runs on the client OS 210 and communicates with the pseudo-printing apparatus driver 113 of the server 1. Each of the pseudo-application 212 and the pseudo-printing apparatus driver 113 operate as a proxy server and can perform bidirectional information communication.

The print data generating unit 202 uses the printing apparatus driver 211 to generate print data for the printing apparatus 3A, based on a printing request from the pseudo-application 212.

The print data transmitting unit 203 transmits the print data generated by the print data generating unit 202 to the printing apparatus 3A.

The storage section 21 stores, for example, the client OS 210 that causes the control section 20 to serve as the respective units, the printing apparatus driver 211 that is provided for each printing apparatus and is used to generate print data, and the pseudo-application 212 that runs on the client OS 210 and communicates with the pseudo-printing apparatus driver 113.

When the communication between the server 1 and the terminal apparatus 2A is established, the pseudo-application 212 is downloaded from the server 1 to the client OS 210 and is then executed. The download and start timing will be described later with reference to FIG. 5. A user of the terminal apparatus 2A may install the pseudo-application 212 in advance.

Figure 4:
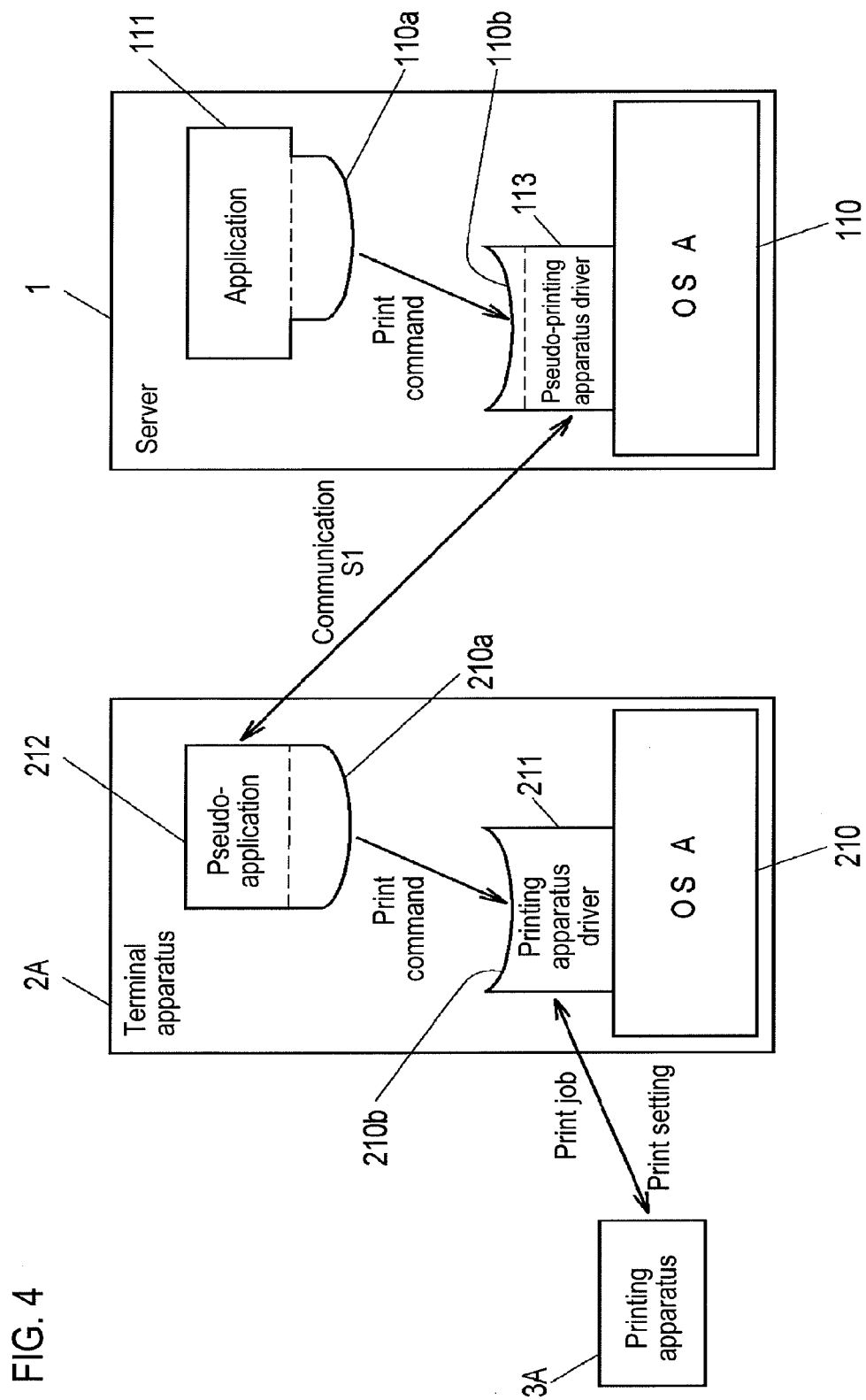
FIG. 4 is a diagram schematically illustrating an example of communication between the server and the terminal apparatus.

FIG. 4 is a diagram schematically illustrating an example of communication between the server 1 and the terminal apparatus 2A. The terminal apparatuses 2B to 2D have the same structure as the terminal apparatus 2A, and a description thereof will be omitted.

In the first exemplary embodiment, the server OS 110 and the client OS 210 are the same "OS A". Also, the "OS A" provides to each of the application and the printing apparatus driver a communication interface which depends on the OS. Therefore, interfaces 110a and 110b for communication between the application 111 and the pseudo-printing apparatus driver 113 and interfaces 210a and 210b for communication between the pseudo-application 212 and the printing apparatus driver 211 have the same format (in FIG. 4, for ease of explanation, the interfaces are drawn by the same curve).

In this structure, since the pseudo-printing apparatus driver 113 and the pseudo-application 212 include the same interfaces 110b and 210a, direct communication S1 can be established between the pseudo-printing apparatus driver 113 and the pseudo-application 212.

That is, according to the structure shown in FIG. 4, the pseudo-printing apparatus driver 113 receives each command from the application 111, and each command received by the pseudo-printing apparatus driver 113 is transmitted to the pseudo-application 212 by the direct communication S1. Then, the commands are transmitted from the pseudo-application 212 to the printing apparatus driver 211.

(Operation of Printing System)

Next, the operation of the printing system according to the first exemplary embodiment of the invention will be described with reference to the drawings.

(1) Operation Before Printing

First, when the user operates the operating section 24 to input an instruction to the terminal apparatus 2A, the terminal apparatus 2A transmits a request to execute the application 111 to the server 1. The application executing unit 101 of the server 1 receives the execution request from the terminal apparatus 2A and executes the application 111. The UI generating unit 100 transmits a UI image to be displayed as a UI screen on the display section 23 of the terminal apparatus 2A as the process result.

Then, when the user operates the operating section 24 of the terminal apparatus 2A to input an instruction, the application 111 creates document data such as word processor data. In addition, when the user inputs an operation instruction to request the printing apparatus 3A to perform printing based on the content of the document data created by the user, the server 1 receives the printing request and operates the printing apparatus 3A to perform printing.

(2) Printing Operation

Next, the operation of the server 1, the terminal apparatus 2A, and the printing apparatus 3A during printing will be described.

Figure 5:
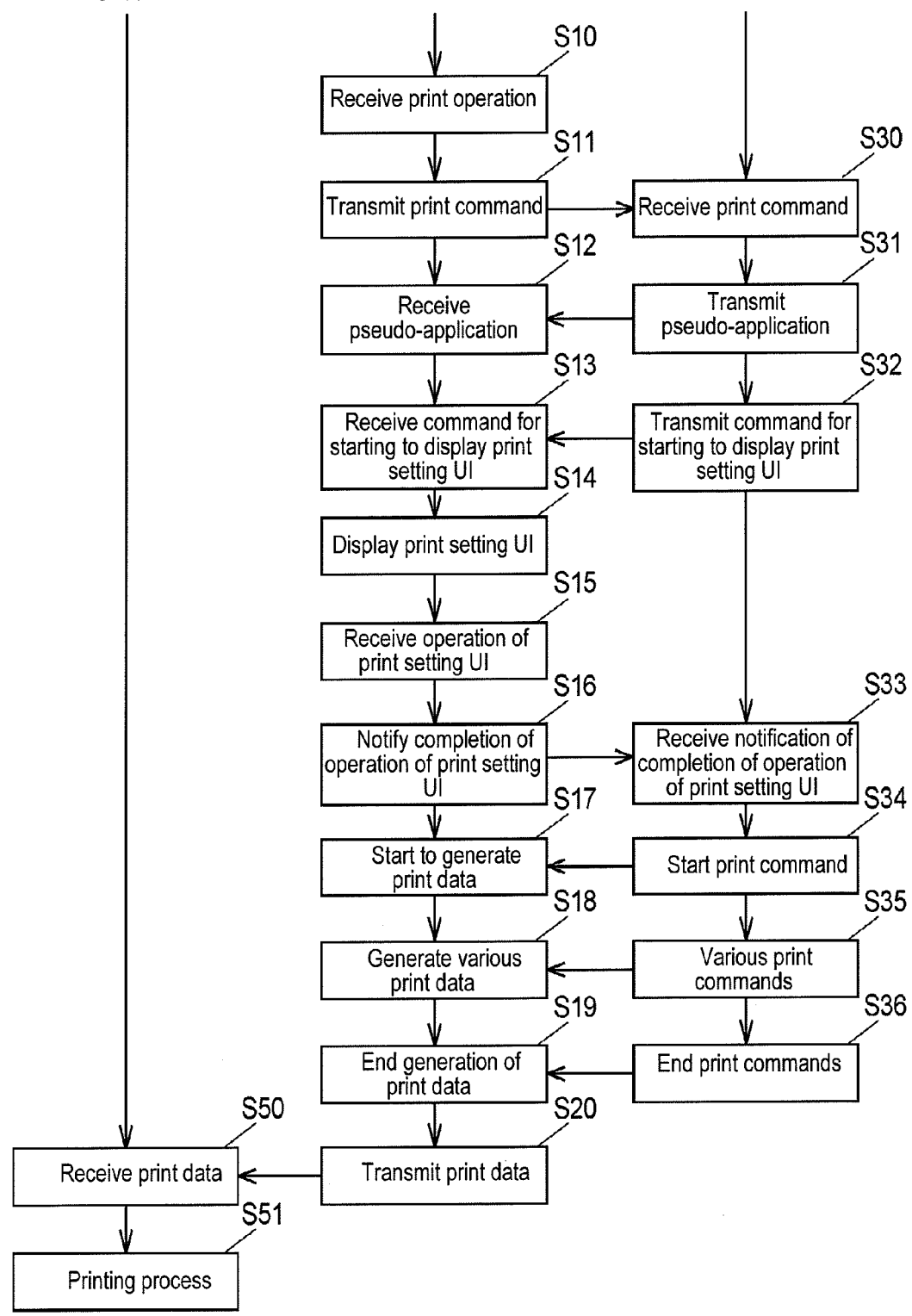
FIG. 5 is a flowchart illustrating an example of an operation of the printing system.

FIG. 5 is a flowchart illustrating an example of the operation of the printing system 7.

First, when a user inputs a printing operation to the terminal apparatus 2A (S10), the terminal apparatus 2A transmits a request for a printing command to the server 1 (S11).

Then, when receiving the printing command from the terminal apparatus 2A (S30), the printing program executing unit 102 of the server 1 transmits the pseudo-application 114 to the terminal apparatus 2A (S31).

Then, the terminal apparatus 2A receives the pseudo-application 114 from the server 1 and stores the pseudo-application 114 as the pseudo-application 212 in the storage section 21 of the client OS 210 (S12).

The pseudo-application 212 is downloaded and stored in the terminal apparatus 2A. In this way, the structure shown in FIG. 4 is implemented. That is, the exemplary embodiment can be used even in the structure in which the terminal apparatus 2A does not have the pseudo-application 212 in advance. The pseudo-application 212 may be installed in the terminal apparatus 2A in advance.

Then, the printing program executing unit 102 performs the communication S1 with the terminal apparatus 2A, that is, transmits commands to the terminal apparatus 2A through the pseudo-printing apparatus driver 113 and the pseudo-application 212 so as to start displaying a UI for a print setting operation (S32). The UI for a print setting operation may be displayed when the user of the terminal apparatus 2A inputs a command indicating that the UI needs to be displayed.

Then, the application executing unit 201 of the terminal apparatus 2A receives the command to display the UI for a print setting operation (S13) and transmits a print setting UI display command to the printing apparatus driver 211. The printing apparatus driver 211 displays an image of the UI for a print setting operation on the display screen according to the print setting UI display command (S14). The printing apparatus driver 211 receives operation contents, such as sheet setting, N-up setting, and double-side/single-side printing setting, which are input by the user through the displayed image (S15). When the print setting is completed, the printing apparatus driver 211 notifies the server 1 that the print setting operation has been completed in the print setting UI using the communication S1 (S16).

Since the printing apparatus driver 211 of the terminal apparatus 2A displays the print setting UI and processes the operation input through the displayed print setting UI, the server 1 does not need to generate and transmit the print setting UI, unlike the related art.

The printing program executing unit 102 of the server 1 receives information indicating that the operation has been completed in the print setting UI (S33) and starts a printing command using document data created by the application executing unit 201 (S34). In this case, the printing command is transmitted from the application executing unit 201, which executes the application 111, to the print data generating unit 202, which executes the printing apparatus driver 211, through the printing program executing unit 102 which executes the pseudo-printing apparatus driver 113, the communication S1, and the application executing unit 201 which executes the pseudo-application 212.

The print data generating unit 202 which executes the printing apparatus driver 211 starts to generate print data according to the print command (S17) and generates various printing commands (S35) and generates various print data of the application executing unit 101 (S18).

When the application executing unit 101 ends the printing command (S36), the print data generating unit 202 ends the generation of print data (S19), and the print data transmitting unit 203 which executes the printing apparatus driver 211 transmits the generated print data to the printing apparatus 3A (S20).

Then, the printing apparatus 3A receives the print data (S50) and performs a printing process based on the print data (S51).

[Second Exemplary Embodiment]

A second exemplary embodiment of the invention is configured so as to deal with the case in which different OSs run on the server 1 and the terminal apparatus 2A, respectively.

Figure 6:
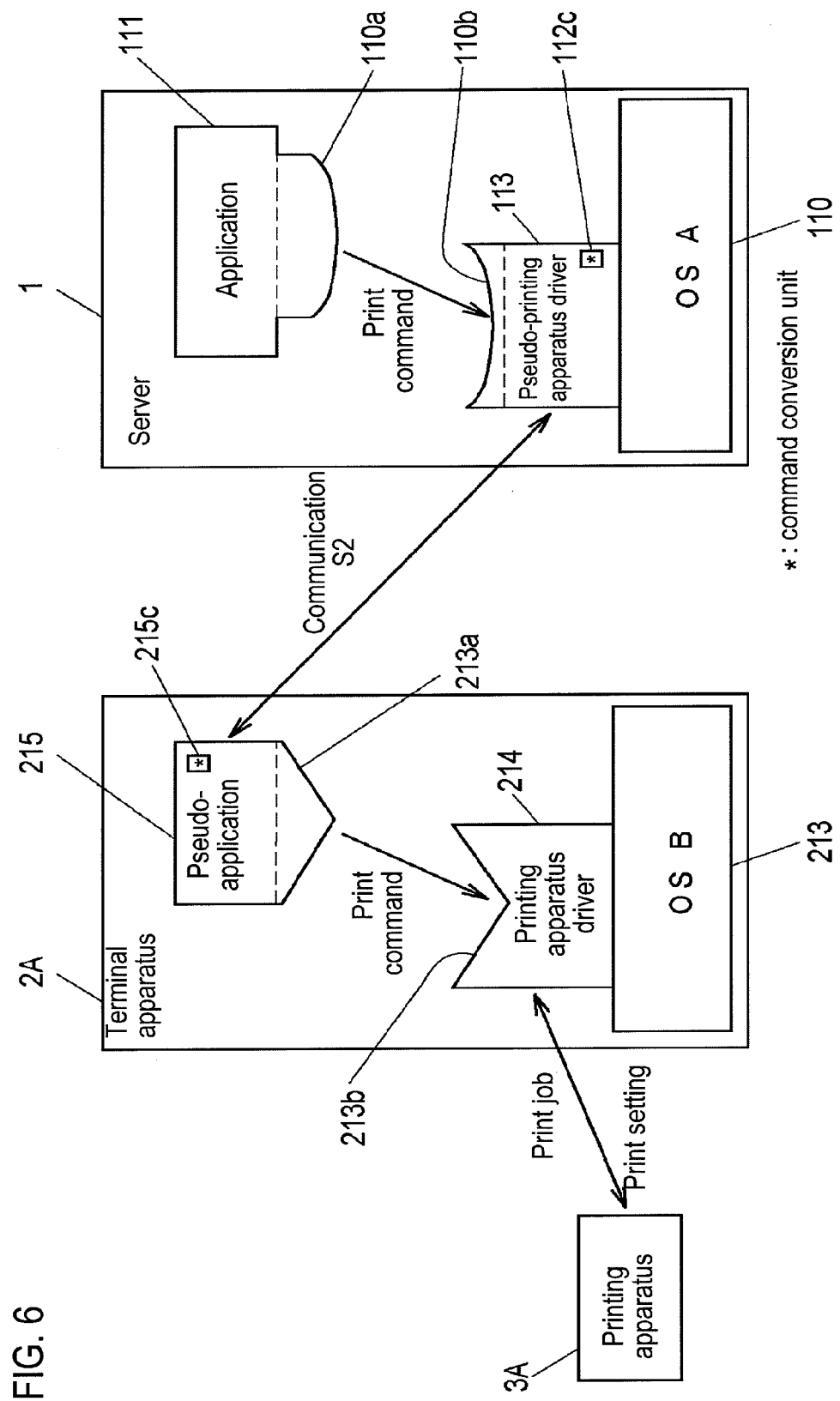
FIG. 6 is a diagram schematically illustrating an example of communication between a server and a terminal apparatus according to a second exemplary embodiment of the invention.

FIG. 6 is a diagram schematically illustrating an example of communication between the server 1 and the terminal apparatus 2A according to the second exemplary embodiment of the invention.

In the second exemplary embodiment, a server OS 110 and a client OS 213 are different operating systems "OS A" and "OS B". For communication, the "OS B" provides interfaces 213a and 213b, which are different from those of the "OS A", to an application and a printing apparatus driver. Therefore, interfaces 110a and 110b for communication between the application 111 and the pseudo-printing apparatus driver 113 and the interfaces 213a and 213b for communication between the pseudo-application 215 and the printing apparatus driver 214 have different formats (in FIG. 6, the interfaces are drawn in different shapes).

In this structure, since the pseudo-printing apparatus driver 113 and the pseudo-application 215 include different interfaces 110b and 213a, communication S2 which uses commonly understood commands is required.

In this case, in order to establish the communication S2, at least one of a command conversion unit 112c of the pseudo-printing apparatus driver 113 and a command conversion unit 215c of the pseudo-application 215 may be provided to translate commands. Detailed examples of the translation will be described below.

Figure 7A:
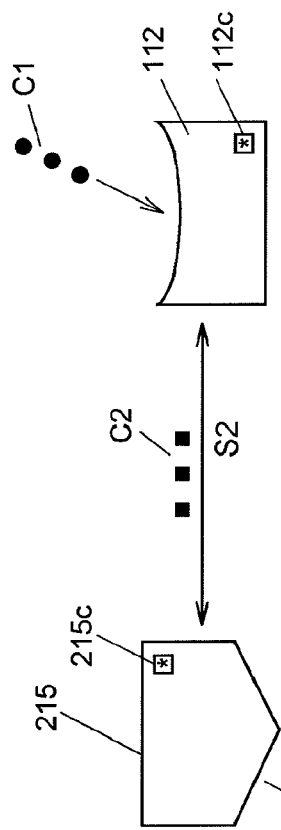
FIGS. 7A to 7C are diagrams schematically illustrating a command conversion operation which is executed by a command conversion unit of a pseudo-printing apparatus driver and/or a command conversion unit of a pseudo-application.
Figure 7B:
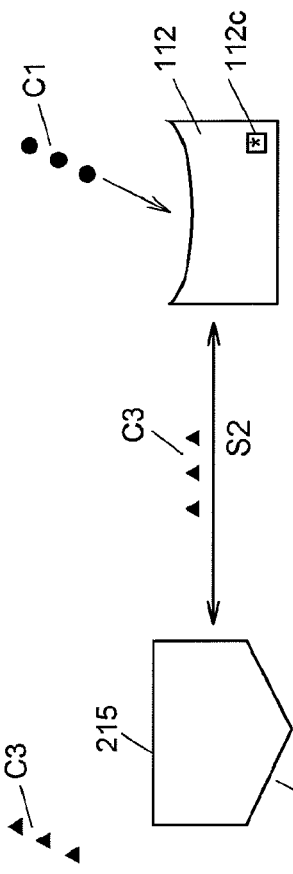
Figure 7C:
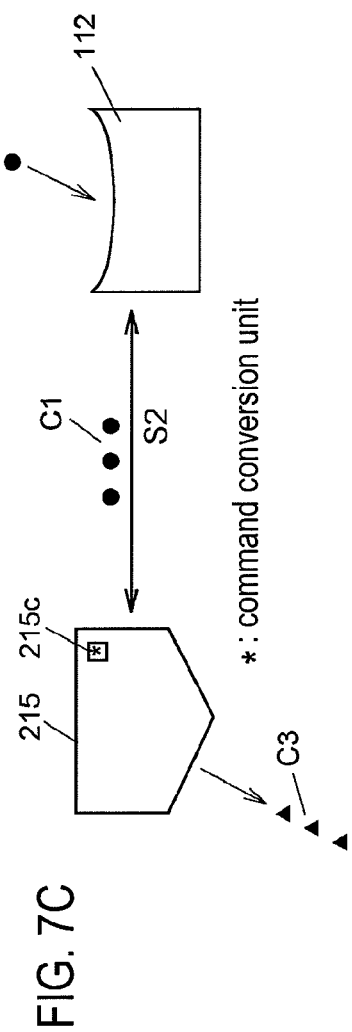

FIGS. 7A to 7C are diagrams schematically illustrating the command conversion operation which is performed by the command conversion unit 112c of the pseudo-printing apparatus driver 113 and/or the command conversion unit 215c of the pseudo-application 215.

Commands C1 shown in FIG. 7A are output by the application executing unit 101 which executes the application 111. Commands C3 are output by the application executing unit 201 which executes the pseudo-application 215.

For example, the command conversion unit 112c translates the commands C1 into commands C2 that are understood by the command conversion unit 215c and can be translated into the commands C3. According to this structure, the printing system 7 can deal with the case in which plural terminal apparatuses uses different OSs (or interfaces).

As shown in FIG. 7B, for example, the command conversion unit 112c translates the commands C1 into the commands C3 that are understood by the pseudo-application 215. According to this structure, the printing system 7 can deal with the case in which plural terminal apparatuses uses a common OS.

As shown in FIG. 7C, for example, the command conversion unit 215c translates the commands C1 into the commands C3 that are understood by the printing apparatus driver 214. According to this structure, the printing system 7 can deal with the case in which plural terminal apparatuses uses different OSs.

The printing system 7 according to the second exemplary embodiment performs the above-mentioned command translation to establish the communication S2 and perform the operation shown in FIG. 5 in the same way as that in the first exemplary embodiment even though the server 1 and the terminal apparatus 2A have different OSs.

[Other Exemplary Embodiments]

The invention is not limited to the above-described exemplary embodiments, but various modifications and changes can be made thereon without departing from the scope and spirit of the invention. For example, the terminal apparatus 2A may execute the application 111 and the printing apparatus 3B connected to the terminal apparatus 2B may perform printing.

The UI generating unit 100, the application executing unit 101, the printing program executing unit 102, and the client OS 210 used in the above-described embodiment may be executed to read the UI display unit 200, the application executing unit 201, the print data generating unit 202, and the print data transmitting unit 203 from a storage medium, such as a CD-ROM, to the storage unit of the terminal apparatus, or the UI display unit 200, the application executing unit 201, the print data generating unit 202, and the print data transmitting unit 203 may be downloaded from the server connected to a network, such as the Internet, to the storage unit of the terminal apparatus. In addition, some or all of the units used in the above-described embodiments may be implemented by software such as ASIC.

What is claimed is:

1. An information processing apparatus comprising:
an application executing unit that executes an application according to operation content received from an external terminal apparatus and outputs a printing command to print an execution result; and a printing program executing unit that receives the printing command output from the application executing unit using a pseudo-printing apparatus driver and transmits the printing command from the pseudo-printing apparatus driver to a pseudo-application that can output the printing command to a printing apparatus driver of the external terminal apparatus connected to a printing apparatus through a local area network.

2. The information processing apparatus according to claim 1, wherein when an operating system that implements the pseudo-printing apparatus driver and an operating system that implements the pseudo-application are different from each other, the printing program executing unit translates the printing command in at least one of the pseudo-printing apparatus driver and the pseudo-application.

3. The information processing apparatus according to claim 1, wherein when communication with the external terminal apparatus is established, the printing program executing unit transmits the pseudo-application to the external terminal apparatus, and the pseudo-application is downloaded to the external terminal apparatus and is executed.

4. An information processing method comprising:

executing an application according to operation content received from an external terminal apparatus;

outputting a printing command to print a result of the executing of the application;

receiving the printing command output using a pseudo-printing apparatus driver; and transmitting the printing command from the pseudo-printing apparatus driver to a pseudo-application that can output the printing command to a printing apparatus driver of the external terminal apparatus connected to a printing apparatus through a local area network.

5. A non-transitory computer-readable medium storing a program that causes a computer to execute information processing, the information processing comprising:

executing an application according to operation content received from an external terminal apparatus;

outputting a printing command to print a result of the executing of the application;

receiving the printing command output using a pseudo-printing apparatus driver; and transmitting the printing command from the pseudo-printing apparatus driver to a pseudo-application that can output the printing command to a printing apparatus driver of the external terminal apparatus connected to a printing apparatus through a local area network.

6. A printing system comprising:

a terminal apparatus including a first storage unit that stores:

a printing apparatus driver of a printing apparatus connected through a local area network; and a pseudo-application that can output a printing command to the printing apparatus driver, and an application executing unit of the terminal apparatus that executes the pseudo-application; and an information processing apparatus including;

a second storage unit that stores an application; and a pseudo-printing apparatus driver, an application executing unit of the information processing apparatus that executes the application according to operation content received from the terminal apparatus and outputs the printing command to print an execution result, and a printing program executing unit that transmits the printing command output from the application executing unit of the information processing apparatus to the pseudo-application of the terminal apparatus through the pseudo-printing apparatus driver so that the pseudo-application uses the printing apparatus driver of the terminal apparatus to control the printing apparatus to perform printing.

\* \* \* \* \*